C. N. GOODALL.
LOCOMOTIVE.
APPLICATION FILED JULY 24, 1917.
1,261,021.
Patented Apr. 2, 1918.
2 SHEETS—SHEET 2.
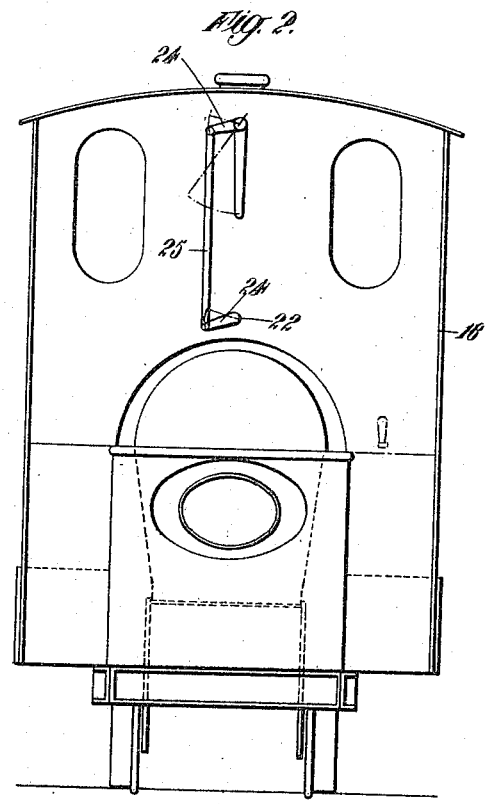
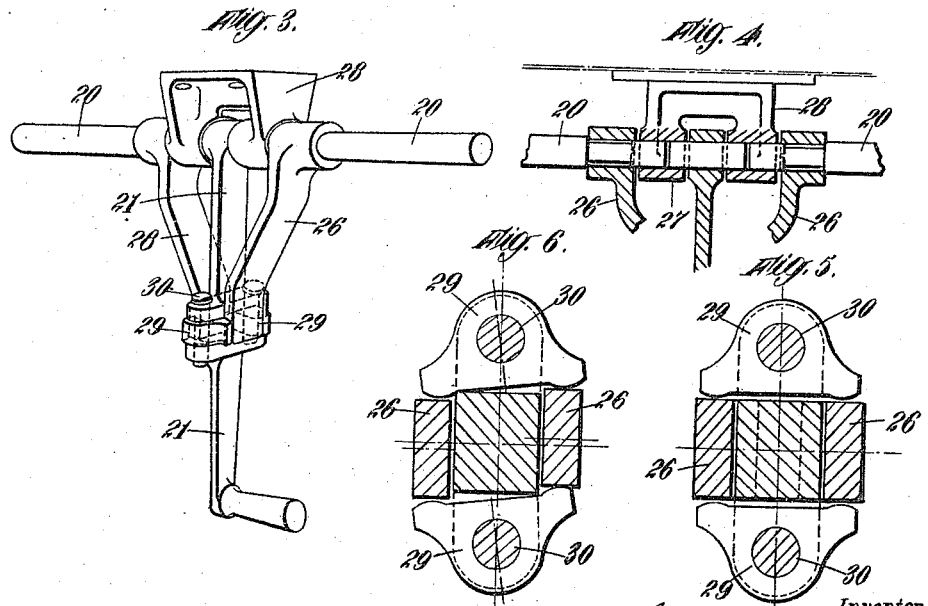

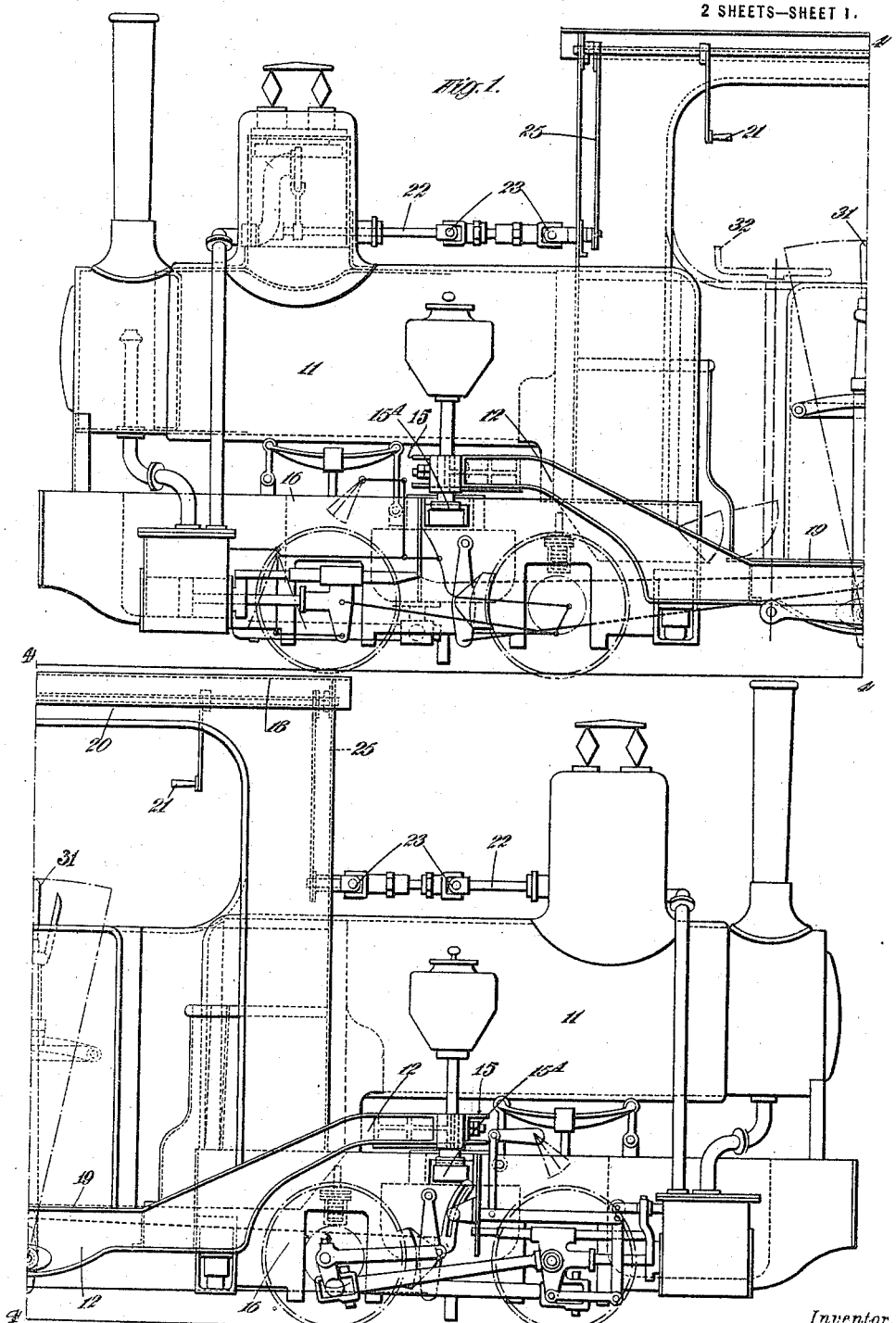

UNITED STATES PATENT OFFICE.

CLARENCE NOEL GOODALL, OF DARLINGTON, ENGLAND, ASSIGNOR OF ONE-HALF TO ROBERT STEPHENSON AND COMPANY (1914) LIMITED, OF DARLINGTON, ENGLAND.

LOCOMOTIVE.

1,261,021.  Specification of Letters Patent.  Patented Apr. 2, 1918.

Application filed July 24, 1917. Serial No. 182,570.

*To all whom it may concern:*

Be it known that I, CLARENCE NOEL GOODALL, a subject of the King of Great Britain, residing at Darlington, in the county of Durham, England, have invented new and useful Improvements in or Relating to Locomotives, of which the following is a specification.

This invention relates to articulated locomotives of the kind wherein two engines or units are coupled together by means of a frame which at or near its extremities connects with each engine at or near the center of its wheelbase by means of ball and socket or other flexible joints, and upon which frame the drivers' platform and cab common to the two units are mounted, the chief object of the invention being to provide for the simultaneous manipulation or control of the regulators of both units from the aforesaid platform, which platform is capable of independent movement relatively to the engines or units.

According to the present invention I provide a duplex articulated locomotive of the kind with means whereby the two power units are controlled by one set of levers, handles or the like situated in the cab which forms part of the independent platform connecting the two power units together, the said set of levers, handles or the like being connected by flexible attachments to the parts to be controlled of each power unit. The said flexible attachments preferably include universal joints or connections arranged at points as near as practicable over the pivotal connections of the units or engines.

In order that the invention may be clearly understood and readily carried into effect the same will now be more fully described with the aid of the accompanying drawings, in which:—

Figure 1 is a side elevation of the improved duplex locomotives.

Fig. 2 is a vertical section on line 4—4 of Fig. 1, showing the regulator control mechanism within the cab.

Figs. 3, 4, 5 and 6 are detail views drawn to a larger scale of the compensating arrangement for the regulator gear.

11, 11 are the two self-contained locomotives and 12 is the independent frame or platform connected to each locomotive at its extremities through the intermediary of flexible joints of the ball and socket type at points preferably centrally disposed with reference to the wheel base one part of each joint being carried by a cross-stretcher 15 attached to the intermediate frame 12 and the other part of the joint being carried by a cross-stretcher 15ª attached to the frame 16 of the locomotive so as to enable the locomotives to move in the desired manner relatively to each other. The frame or cradle 12 is preferably of the form shown in Fig. 1 the central portion forming the base for supporting the cab 18 and control platform 19, from which latter the regulator gear, reversing gear and brake gear of both engines or units are controlled.

The means for controlling the regulator of each locomotive are mounted within the cab 18 and consist of a shaft 20 arranged near the roof of the cab and extending longitudinally thereof. On said shaft is mounted one or more handles 21, as may be desired. The regulator of each locomotive is connected to the control handle or handles 21 by means of flexible connecting gear comprising in the example shown a shaft 22 including universal joints 23 and connecting with the shaft 20 through levers 24 and link 25, provision being made in the said universal joints to accommodate any variation in their length due to the pivotal movement of the locomotives. In small engines an unbalanced sliding regulator may be used so that any slip or error in the gear caused by the pivotal movement of the engines can be provided for in the regulator slide. In larger engines, however, a balanced regulator will preferably be used to minimize the control effort, in which case the slip or error is provided for by a compensating arrangement fitted to the regulator control handle 21 arranged centrally, see Figs. 3 and 4, and adapted to absorb movements or errors in the gear and to prevent them influencing or re-acting upon the regulator valves. In this connection the shaft 20 is in two parts each having an operating lever 26 fixed at or near the contiguous ends, see Fig. 3. The levers 26, 26 are thus independent of each other and situated a short distance apart. In the space between them is the regulator control handle 21 carried on a spindle 27 loosely mounted between the ends of the two shafts or rods 20 and therefore adapted to move independently upon an axis in line with the shafts 20 (Fig. 4). Said spindle 27 is mounted in a bracket or other suitable bearing 28 fixed to the cab roof or other convenient support. In the working position the three levers 26, 21, 26, will be in the same transverse plane, the main lever 21 being somewhat longer than the other two and provided with the regulator control handle. The said lever 21 is furnished on opposite sides with cross-pieces 29, extending over the edges of the levers 26, see Figs. 3, 5 and 6, so that when the main lever 21 is moved to one side or the other it brings the two shorter levers 26 with it, the cross-pieces 29 being pivoted at 30 at right angles to the main lever and so mounted that, when the engine is standing upon a straight and level road, the faces of the cross-pieces 29 do not actually touch the side levers 21 but have a small amount of play. Fig. 5 shows the compensating levers in the normal position and Fig. 6 their relative positions when in operation. With this arrangement any twist or error in the control mechanism due to the effect of curving or other irregularities of the road can thereby be compensated for and both regulators accurately controlled. Further, if owing to any resistance in the packings or connections one regulator should be stiffer in its movements than the other the compensating device provides for their being moved as nearly as possible together and insures the absolute shutting of both under all conditions. The reversing gear of both engines may be connected to and operated from a single reversing handle 31 (Fig. 1) or apparatus such as a screw or steam gear, and the brake gear may be similarly controlled from a wheel 32 or other suitable device.

To enable one of the units to be used independently and adapt the control mechanism for such use, the rear end of the flexible connection may be supported in a bracket and provided with a handle for operating it in the ordinary manner, or each engine may be fitted with an ordinary internal regulator rod controlled by a handle in the usual way, the front end connecting with the under side of the regulator. When using the engines as a duplex engine the regulator handle could be removed and the engine controlled from the flexible connection only, or in building the engines provision could be made for fitting ordinary regulator gear although the actual gear could be omitted, while the locomotive was being used as a duplex unit.

Although the duplex articulated locomotive shown is essentially a high pressure locomotive it will be understood that it may be one of the compound type, in which case one of the units would be fitted with low pressure instead of high pressure cylinders and adapted to take its steam from the high pressure cylinders of the other unit through flexible ball and socket pipes in the ordinary way. The high pressure unit would be a complete locomotive unit, while the low pressure unit would consist of an engine only without boiler its cylinder being adapted for low pressure steam.

What I claim and desire to secure by Letters Patent of the United States is:—

1. A duplex articulated locomotive comprising two power units, an intermediate frame flexibly connected at each end to said units, a platform carried by said frame and means associated with said platform for centralizing the control of both units.

2. A duplex articulated locomotive comprising two power units, an intermediate frame connecting said units, a platform carried by said frame, a system of controls whereby the two units can be manipulated from said platform by a single set of controlling means, and means for flexibly connecting said controlling means to the units.

3. A duplex articulated locomotive comprising two power units, a frame connecting said units together, a control platform carried by the frame, controlling means carried rigidly upon said platform, and flexible connecting gear between said controlling means and the parts to be controlled.

4. A duplex articulated locomotive comprising two power units, an intermediate frame connecting said units together, a central platform and a cab on said frame common to the two units, centralized control means mounted in said cab, and flexible gear for connecting the control means to the parts of each unit to be controlled.

5. A duplex articulated locomotive comprising two power units, a cab and a central platform common to the units, a regulator system including a controlling gear consisting of a central set of levers carried by the platform, and means for connecting said levers to the regulator of each unit.

6. A duplex articulated locomotive comprising two power units, a central control platform between said units, which platform is capable of movement relatively to each unit, a regulator control system common to both units, controlling gear carried by the platform for operating said system, and means for compensating for any slip in the control gear resulting from the relative movement of the units.

7. A duplex articulated locomotive comprising two power units, a central control platform connecting said units together, a regulator control system mounted partly on the platform and partly on each unit, flexible means for connecting the parts on the platform to the parts on the units, control handles associated with the parts on the platform and means adapted to permit of slight independent movement of said handles.

8. A duplex articulated locomotive comprising two power units, a central control platform between said units, a regulator control system including flexible controlling gear, a set of handles on said platform for manipulating said system, and compensating gear associated with said handles.

9. A duplex articulated locomotive comprising two power units, a central control platform common to the two units, a regulator control system connecting the regulators of each unit, including a set of control levers mounted on said platform, flexible gear connecting said levers to the regulators, and compensating means associated with said levers.

CLARENCE NOEL GOODALL. [L. S.]

Signed sealed and delivered by the above named Clarence Noel Goodall in the presence of—

A. MACDONALD.

Copies of this patent may be obtained for five cents each, by addressing the "Commissioner of Patents, Washington, D. C."